United States Patent Office 2,979,290
Patented Apr. 11, 1961

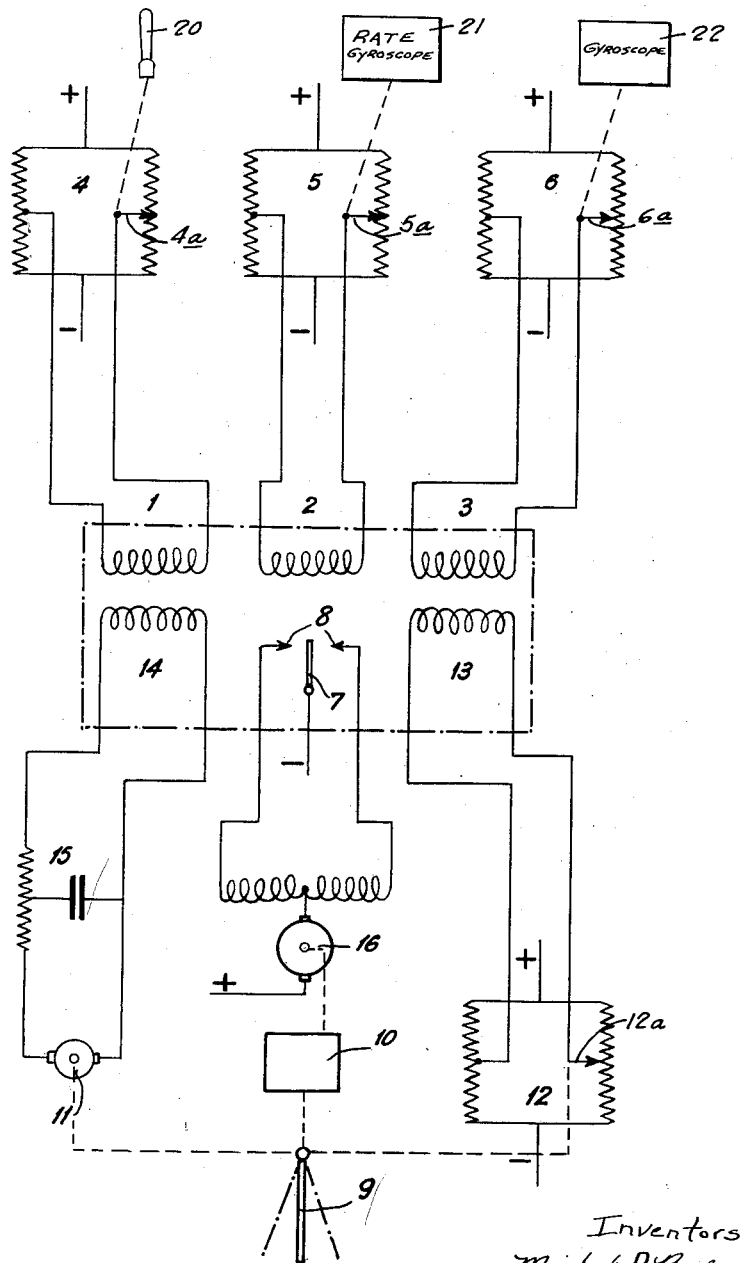

2,979,290

MIXED CORRESPONDENCE CONTROL DEVICE FOR THE CONTROL MEMBERS OF AN AIRCRAFT

Michel Paul Baliguet, Dammarie-les-Lys, Günther Ernst, Suresnes, and Jean Jardinier, Vitry-sur-Seine, France, assignors to Societe Nationale d'Etude et de Construction de Moteurs d'Aviation, Paris, France, a company of France Filed Nov. 29, 1957, Ser. No. 699,681

Claims priority, application France Dec. 4, 1956

3 Claims. (Cl. 244—77)

In stabilising and control systems for aircraft, and more particularly for aircraft which take-off and land vertically, the follow-up action of the control members can be obtained either by a position signal, the position of the control member being proportional to the values of said position signal, or by a speed signal, the speed of the control member being then proportional to the values of said speed signal.

With correspondence-control by position, the controlled member is coupled to the actuating system, which enables it to be put into the neutral position at the moment of taking-off, but on the other hand the response time is too long.

With the correspondence-control by speed, the response is more rapid and the compensation of gyroscopic effects is effected automatically, but the position of the controlled member is no longer coupled to the actuating system and the controlled member may have a certain angular displacement at the moment of taking-off, thus causing an out-of-balance of the stabilising system.

The device which forms the object of the invention comprises a mixed correspondence control of the controlled member which enables the advantages of the two previous systems to be combined by using a signal composed of the algebraic sum of a position signal and a speed signal.

The position signal is given by a potential which varies as a function of the position of the controlled member, which can be carried out by means of a potentiometer, the slider of which is coupled to the controlled member, whilst the speed signal is given by the potential at the terminals of a generator, the moving member of which is driven by the controlled member. The main property of the mixed correspondence control is that it gives the possibility of regulating to a very great extent the ratio between the speed signal and the position signal. Thus it is possible to increase the preponderant effect of the speed signal during taking-off or landing, and to reduce it during the other phases of flight.

This follow-up control has on the other hand the advantage of being capable of use either for control by position or for control by speed, depending on whether the return signals of the one or the other are cut-off.

The controlled member itself may be of any appropriate type; in the case of an aircraft propelled by reaction, it may consist of a device for the non-symmetrical deflection of the jet.

The description which follows below with reference to the accompanying drawings (which are given by way of example only and not in any sense by way of limitation) will make it quite clear how the invention may be carried into effect.

The single figure of the drawing shows diagrammatically an example of construction in accordance with the invention of a mixed follow-up control device for a controlled member acting on the aircraft about one of the three axes of reference.

In this device, the coils 1, 2 and 3 of a relay amplifier are respectively connected to the diagonals of three Wheatstone bridges, each formed by a fixed resistance and a potentiometer. The centre point of the fixed resistance and the slider of the potentiometer form the extremities of the diagonal comprising one of the coils 1, 2 and 3. The slider 4a of the bridge 4 is actuated by the pilot's operating lever 20, the slider 5a of the bridge 5 is connected to the gyrometer or rate-gyroscope 21 which detects the angular speed about the axis of reference considered, and the slider 6a of the bridge 6 is connected to the gyroscope 22 which detects the position about that axis.

The signals supplied by the potentiometers 4, 5 and 6, constitute the input signals. A tachometric dynamo 11 coupled to the controlled member 9 supplies the return signal of speed and a potentiometer 12, mounted in a Wheatstone bridge with a resistance having its centre point fixed, supplied the return signal for position, the slider 12a of this potentiometer being connected to the controlled member so as to take-up a position which is a function of that of the controlled member.

The input signals are potential signals applied to the terminals of the coils 1, 2 and 3 of a polarised relay which puts the blade 7 into contact with one or the other of the fixed contacts 8, depending on the sign of the ampere-turns resulting from the algebraic sum of the signals, which causes the rotation of the motor 16 in one direction or in the other.

This motor which drives the controlled member 9 through the medium of a reduction gear 10 is of the series type with two fields. It is provided with an electromagnetic brake, the speed of action of which is proportional to the voltage.

In this particular case in which the amplifier is of the relay type, the system acts fully or not at all, since any detection will produce the maximum torque of the motor, but which becomes continuous and linear by the re-introduction of the signals of speed and of position in the coils 13 and 14, with a sign opposite to the mean potential of the input signals.

In fact, taking account of the transient conditions in the relay-motor unit, the blade 7 oscillates non-symmetrically at a certain frequency between the contacts 8, applying to the terminals of the motor a mean potential which varies with the position of the controlled member, by reason of the return potential re-introduced into the coil 13.

The balance speed-position is obtained when the sum of the input ampere-turns is equal to the sum of the return ampere-turns.

For a zero detection, the blade oscillates symmetrically between the contacts 8, under the action of the input signals applied to the terminals of the polarized relay, which gives a zero mean potential at the terminals of the motor.

The return of speed is effected with a certain delay, which enables the maximum acceleration to be given to the motor, until the speed-position equilibrium is obtained which corresponds to the detection signals.

The delay network, which is constituted in this case by the resistance-capacity circuit 15, contributes to the stability of the aircraft.

Such a follow-up control device enables the controlled member to be put into the neutral position before the aircraft takes-off, and its position can be controlled by displacement of the piloting lever.

In vertical flight, the controlled member is artificially stabilised by the action of a gyroscope and a gyrometer, and reacts with responses identical with those of the follow-up control by speed.

Compensation of the gyroscopic effects is obtained automatically by reaction of the speed of the controlled member.

In normal flight, the aerodynamic stabilisation is superimposed on the artificial stabilisation, and the position of the controlled member always corresponds to the controlling action which is applied, whilst with a correspondence-control by speed only, the controlled member has a tendency to continue to the end of its travel.

What is claimed is:

1. A control device for the control surfaces of a vertical take-off and landing aircraft comprising a control member at the disposal of the pilot, a gyrometer and a gyroscope each including means for producing an input signal, whereby the three input signals are a function of parameters of the movement of the aircraft about its center of gravity and in particular about the axes of references corresponding to one of the control surfaces of the aircraft, an amplifier supplied with said input signals, a motor connected to said amplifier and driving said control surface, means sensitive to the position of said control surface for producing a first follow up signal and means sensitive to the speed of said control surface for producing a second follow up signal and a delay circuit for delaying said second follow up signal, said first follow up signal being first applied to said amplifier where it opposes said input signals, said second follow up signal being applied after delay in said delay circuit to said amplifier where it opposes said input signals in order to make said motor movable in a direction and of an amount which depends on the algebraic sum of the input and follow up signals.

2. A control device for the control surfaces of a vertical take-off and landing aircraft comprising a control member at the disposal of the pilot, a gyrometer and a gyroscope, each acting on the slider of one of three potentiometers mounted in Wheatstone bridges with fixed resistances, for producing an input signal, whereby the three input signals are a function of parameters of the movement of the aircraft about its center of gravity and in particular about the axes of references corresponding to one of the control surfaces of the aircraft, an amplifier supplied with said input signals, a motor connected to said amplifier and driving said control surface, means sensitive to the position and means sensitive to the speed of said control, each of said means producing a follow up signal applied to said amplifier which opposes said input signals, in order to make said motor movable in a direction and of an amount which depends on the algebraic sum of said follow up signals and said input signals.

3. A control device for the control surfaces of a vertical take-off and landing aircraft comprising a control member at the disposal of the pilot, a gyrometer and a gyroscope each including means for producing an input signal, whereby the three input signals are a function of parameters of the movement of the aircraft about its center of gravity and in particular about the axes of references corresponding to one of the control surfaces of the aircraft, an amplifier comprising five coils, three of which receiving said three input signals and constituting a polarised relay, a motor connected to said polarised relay and driving said control surface, means sensitive to the position and means sensitive to the speed of said control, each of said means producing a follow up signal so that said two follow up signals are applied to the two remaining coils of said amplifier, the flux resulting from said signals acting in accordance with its magnitude and its sign on said polarised relay so as to cause the motor of the control surface to rotate in the corresponding direction.

References Cited in the file of this patent

UNITED STATES PATENTS

| | | |
|---|---|---|
| 2,655,327 | McGoldrick | Oct. 13, 1953 |
| 2,663,838 | Holliday et al. | Dec. 22, 1953 |
| 2,873,418 | Owen | Feb. 10, 1959 |